United States Patent
Liu

(10) Patent No.: US 10,687,203 B2
(45) Date of Patent: Jun. 16, 2020

(54) CONTROL CIRCUIT

(71) Applicants: Fu Tai Hua Industry (Shenzhen) Co., Ltd., Shenzhen (CN); HON HAI PRECISION INDUSTRY CO., LTD., New Taipei (TW)

(72) Inventor: Xiao-Bin Liu, Shenzhen (CN)

(73) Assignees: Fu Tai Hua Industry (Shenzhen) Co., Ltd., Shenzhen (CN); HON HAI PRECISION INDUSTRY CO., LTD., New Taipei (TW)

(*) Notice: Subject to any disclaimer, the term of this patent is extended or adjusted under 35 U.S.C. 154(b) by 263 days.

(21) Appl. No.: 15/944,750

(22) Filed: Apr. 3, 2018

(65) Prior Publication Data
US 2019/0230493 A1    Jul. 25, 2019

(30) Foreign Application Priority Data

Jan. 22, 2018 (CN) .......................... 2018 1 0058509

(51) Int. Cl.
| | |
|---|---|
| G06F 3/06 | (2006.01) |
| H04W 8/18 | (2009.01) |
| H04W 8/20 | (2009.01) |
| G11B 5/024 | (2006.01) |
| H04M 1/725 | (2006.01) |
| H04M 1/60 | (2006.01) |
| H04M 1/02 | (2006.01) |

(52) U.S. Cl.
CPC .......... *H04W 8/183* (2013.01); *G06F 3/0607* (2013.01); *G06F 3/0652* (2013.01); *G11B 5/024* (2013.01); *H04M 1/72522* (2013.01); *H04W 8/20* (2013.01); *H04M 1/02* (2013.01); *H04M 1/6041* (2013.01); *H04M 1/72527* (2013.01)

(58) Field of Classification Search
CPC ........ G06F 21/86; G06F 21/88; G06F 3/0607; G06F 3/0652; G11B 5/024; H04W 8/183; H04W 8/20; H04M 1/72522; H04M 1/02; H04M 1/6041; H04M 1/72527
See application file for complete search history.

(56) References Cited

U.S. PATENT DOCUMENTS

| | | | | |
|---|---|---|---|---|
| 2012/0021728 | A1* | 1/2012 | Davis | H04W 4/021 455/414.1 |
| 2014/0004831 | A1* | 1/2014 | Yao | H04W 8/18 455/411 |

* cited by examiner

*Primary Examiner* — Amir Mehrmanesh
(74) *Attorney, Agent, or Firm* — ScienBiziP, P.C.

(57) ABSTRACT

A control circuit to achieve irretrievable erasure of data in a mobile phone comprises a control unit, a SIM unit and a memory unit. The SIM unit is coupled with the control unit and the memory unit. The control unit can provides a delete signal to totally delete data of the memory by the SIM unit.

7 Claims, 1 Drawing Sheet

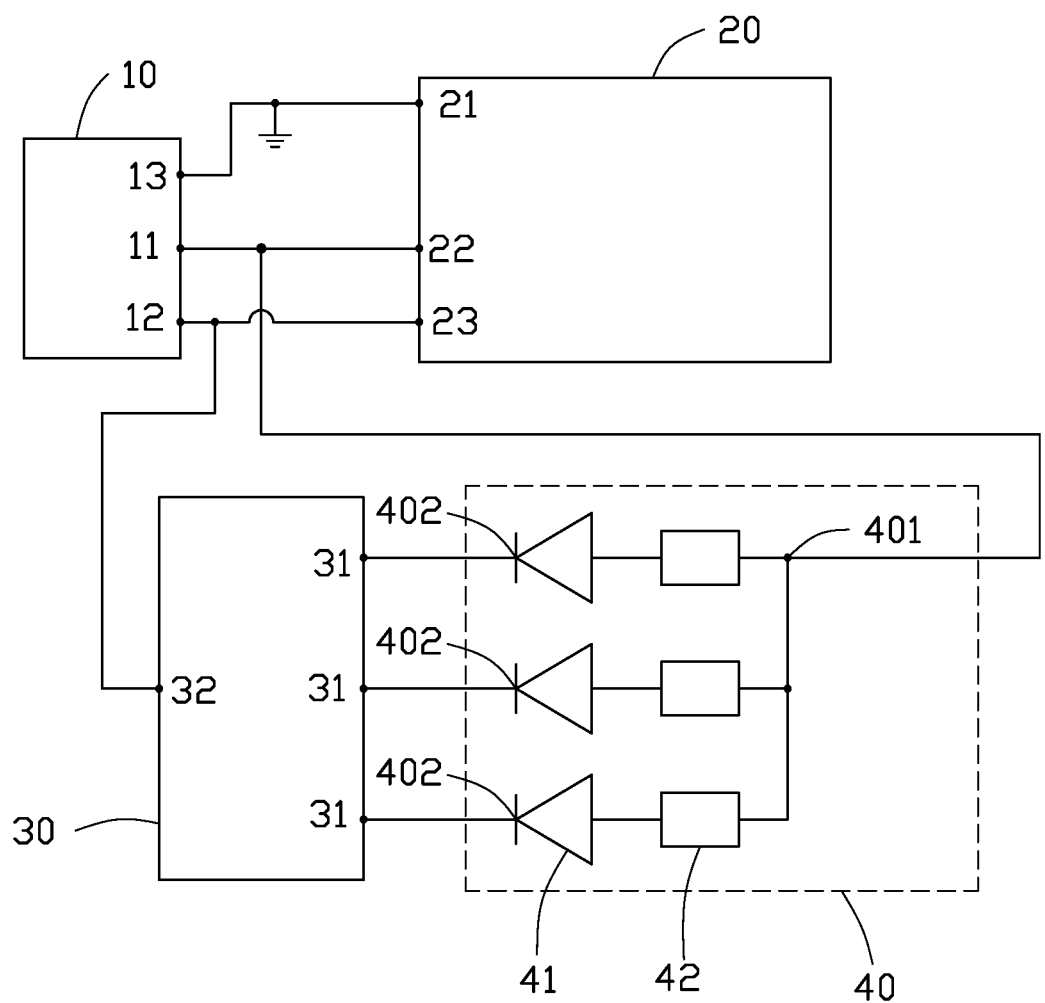

CONTROL CIRCUIT

CROSS-REFERENCE TO RELATED APPLICATIONS

This application claims priority to Chinese Patent Application No. 201810058509.X filed on Jan. 22, 2018, the contents of which are incorporated by reference herein.

FIELD

The subject matter herein generally relates to a circuit, and especially relates to a control circuit for a mobile phone.

BACKGROUNDING

Mobile phones are widely used and become more intelligent.

People using the mobile phone stores a lot of programs and data in the mobile phone. When the mobile phone is not using certain programs or when the phone needs to be replaced, the programs and data in the mobile phone need to be removed. However, such deletion may not be thorough enough. Some unscrupulous people know how to retrieve data that may have been deleted by the user. This ability for unscrupulous people to retrieve delete data is a risk to data security.

BRIEF DESCRIPTION OF THE DRAWING

Implementations of the present technology will now be described, by way of example only, with reference to the attached FIGURE.

The FIGURE is a circuit diagram of a control circuit for a mobile phone of the present disclosure.

DETAILED DESCRIPTION OF EMBODIMENTS

It will be appreciated that for simplicity and clarity of illustration, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. The drawings are not necessarily to scale and the proportions of certain parts have been exaggerated to better illustrate details and features of the present disclosure. The description is not to be considered as limiting the scope of the embodiments described herein.

Several definitions that apply throughout this disclosure will now be presented. The term "comprising" means "including, but not necessarily limited to"; it specifically indicates open-ended inclusion or membership in a so-described combination, group, series and the like. The term "coupled" is defined as connected, whether directly or indirectly through intervening components, and is not necessarily limited to physical connecting. The connecting can be such that the objects are permanently connected or releasably connected.

Referring to the FIGURE, a control circuit 100 of the present disclosure includes a control unit 10, a Subscriber Identification Module (SIM) unit 20 and a memory unit 30. The control circuit 100 according to the present disclosure allows for irretrievable data deletion, for example, a mobile phone. The control unit 10 can irretrievably delete data of the memory unit 30 by the SIM unit 20.

The control unit 10 has a first connecting pin 11, a second connecting pin 12 and a third connecting pin 13.

The SIM unit 20 has a grounding pin 21, a first power pin 22 and a first reset pin 23. The first power pin 22 is located between the grounding pin 21 and the reset pin 23.

The memory unit 30 has a plurality of second power pins 31 and a second reset pin 32. The second power pins 31 are coupled with the first power pin 22. The second reset pin 32 is coupled with the first reset pin 23.

The first connecting pin 11 of the control unit 10 is coupled with the first power pin 22 of the SIM unit 20. The first power pin 22 of the SIM unit 20 is coupled with the second power pins 31. Thus, the control unit 10 provides working voltage for the memory unit 30 by the SIM unit 20.

The second connecting pin 12 of the control unit 10 is coupled with the first reset pin 23 of the SIM unit 20. When it is desired that data be deleted irretrievably, the control unit 10 causes the second connecting pin 12 of the control unit 10 to provide a delete signal, such as a predetermined voltage to the first reset pin 23 of the SIM unit 20. After receiving the delete signal, the first reset pin 23 of the SIM unit 20 controls the second reset pin 32 of the memory unit 30 to delete irrevocably the data of the memory unit 30.

The third connecting pin 13 of the control unit 10 is coupled with the grounding pin 21 of the SIM unit 20.

Furthermore, the control circuit 100 includes a protection unit 40 to protect the memory unit 30 from reverse current and voltage that may damaging the memory unit 30. The protection unit 40 is coupled between the plurality of second power pins 31 and the first power pin 22 of the SIM unit 20.

The protection unit 40 has an input end 401, and a plurality of out end 402 corresponding to the plurality of second power pins 31 of the memory unit 30. The first connecting pin 11 and the first power pin 22 are coupled with the input end 401. The second power pins 31 of the memory unit 30 are accordingly coupled with the output ends 402 of the protection unit 40.

Specifically, the protection unit 40 has multiple protection branches. Each protection branch includes a diode 41 and a resistor 42 coupled in series with the diode 41. The diode 41 is coupled with one output end 402 of the protection unit 40. The resistor 42 is coupled with the input end 401 of the protection unit 40.

The control circuit 100 of the present disclosure works as follows:

First, the control unit 10 is coupled with the SIM unit 20. Specifically, the first connecting pin 11 of the control unit 10 is coupled with the first power pin 22 of the SIM unit 20. The second connecting pin 12 is coupled with the first reset pin 23 of the SIM unit 20. The third connecting pin 13 is coupled with the grounding pin 21 of the SIM unit 20.

Second, the first connecting pin 11 of the control unit 10 controls the first power pin 22 of the SIM unit 20 to provide working voltage for the memory unit 30. The second connecting pin 12 of the control unit 10 can provide a delete signal, such as a predetermined voltage to the first reset pin 23 of the SIM unit 20, after receiving the delete signal, the first reset pin 23 controls the second reset pin 32 to delete irrevocably the data of the memory unit 30.

In the control circuit 100 of the present disclosure, the first connecting pin 11 and the second connecting pin 12 of the control unit 10 are respectively coupled with the first power pin 22 and the first reset pin 23 of the SIM unit 20. The first power pin 22 of the SIM unit 20 is coupled with the second power pins 31. Thus, the control unit 10 can provide a working voltage for the memory unit 30 by the SIM unit 20. The second connecting pin 12 of the control unit 10 can provide a delete signal to the SIM unit 20, and the first reset pin 23 controls the plurality of second pins 32 to delete irrevocably the data of the memory 30. Thus, data in the mobile phone or other device can be deleted irrevocably by the control circuit 100 of the present disclosure. The control circuit 100 of the present disclosure prevents retrieval of the data of the mobile phone.

The embodiments shown and described above are only examples. Many details are often found in the art such as the other features of a control circuit. Therefore, many such details are neither shown nor described. Even though numerous characteristics and advantages of the present technology have been set forth in the foregoing description, together with details of the structure and function of the present disclosure, the disclosure is illustrative only, and changes can be made in the detail, including in matters of shape, size and arrangement of the parts within the principles of the present disclosure up to, and including the full extent established by the broad general meaning of the terms used in the claims. It will therefore be appreciated that the embodiments described above can be modified within the scope of the claims.

What is claimed is:

1. A control circuit for irretrievable deleting data in a mobile phone, the control circuit comprising:
   a control unit, a SIM unit and a memory unit;
   wherein the SIM unit is respectively coupled with the control unit and the memory unit, the control unit provides a delete signal to delete data of the memory unit by the SIM unit, wherein
   the control unit has a first connecting pin and a second connecting pin, the SIM unit has a first reset pin and a first power pin, the first connecting pin is coupled with the first power pin, the second connecting pin is coupled with the first reset pin,
   the memory unit has a plurality of second power pins and a second reset pin, the plurality of the second power pins are coupled with the first power pin, the second reset pin is coupled with the first reset pin,
   the control circuit further comprises a protection unit used for preventing the memory unit from reverse current and voltage,
   the protection unit is coupled between the plurality of second power pins and the first power pin, and
   the protection unit has an input end and a plurality of output ends corresponding to the plurality of second power pins, the input end is coupled with the first connecting pin of the control unit and the first power pin of the SIM unit, the plurality of output ends are accordingly coupled with the plurality of second power pins of the memory unit.

2. The control circuit of claim 1, wherein the control unit controls the SIM unit to provide a working voltage for the memory unit by the first power pin coupled with the plurality of second power pins.

3. The control circuit of claim 1, wherein the control unit is configured to provide the delete signal to the first reset pin of the SIM unit, the first reset pin of the SIM unit controls the second reset pin to delete irrevocably data of the memory unit.

4. The control circuit of claim 1, wherein the control unit further comprises a third connecting pin, the SIM unit comprises a grounding pin, the third connecting pin is coupled with the grounding pin.

5. The control circuit of claim 1, wherein the delete signal is a voltage signal.

6. The control circuit of claim 1, wherein the protection unit has multiple protection branches, each protection branch comprises a diode and resistor coupled in series with the diode.

7. The control circuit of claim 6, wherein the diode is coupled with one output end of the protection unit, the resistor is coupled with the input end of the protection unit.

* * * * *